(12) United States Patent
Takashima

(10) Patent No.: US 6,246,434 B1
(45) Date of Patent: Jun. 12, 2001

(54) VIDEO APPARATUS WHICH CAN BE ADJUSTED EASILY

(75) Inventor: Tadao Takashima, Saitama-ken (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 08/948,665

(22) Filed: Oct. 10, 1997

(30) Foreign Application Priority Data

Oct. 14, 1996 (JP) .................................................. 8-271089

(51) Int. Cl.[7] .............................. H04N 17/00; H04N 5/44; H04N 5/64
(52) U.S. Cl. ......................... 348/180; 348/180; 348/189; 348/190; 348/839
(58) Field of Search .................................... 348/839, 189, 348/190, 553, 177, 178, 180, 191; H04N 17/00, 17/02, 17/04

(56) References Cited

U.S. PATENT DOCUMENTS

| 4,649,428 | * | 3/1987 | Jones et al. ............................ 358/188 |
| 4,731,654 | * | 3/1988 | Itabashi et al. ........................ 358/188 |
| 4,757,239 | * | 7/1988 | Starkey, IV ............................ 315/371 |
| 4,858,006 | * | 8/1989 | Suzuki et al. .......................... 358/139 |
| 5,099,326 | * | 3/1992 | Hakamada et al. ................... 358/139 |
| 5,227,863 | * | 7/1993 | Bilbrey et al. .......................... 358/22 |
| 5,325,196 | * | 6/1994 | Yoshimi et al. ....................... 348/190 |
| 5,448,288 | * | 9/1995 | Oue et al. .............................. 348/190 |
| 5,619,250 | * | 4/1997 | McClellan et al. .................... 348/10 |
| 5,621,482 | * | 4/1997 | Gardner et al. ....................... 348/725 |
| 5,734,442 | * | 3/1998 | Machado .............................. 348/705 |
| 5,790,189 | * | 8/1998 | Moon ................................... 348/189 |
| 5,850,265 | * | 12/1998 | Suh ...................................... 348/553 |

FOREIGN PATENT DOCUMENTS

| 178844 | 4/1986 | (EP) . |
| 2169773A | 7/1986 | (GB) . |
| 87/02508 | 4/1987 | (WO) . |

* cited by examiner

*Primary Examiner*—Reinhard J. Eisenzopf
*Assistant Examiner*—Paulos Natnael
(74) *Attorney, Agent, or Firm*—Pillsbury Winthrop LLP

(57) ABSTRACT

By connecting the module 1 to the BUS line 6 of the adjustable tester 5, and then, by inputting commands or data from the inputting/outputting means (adjusting means) 4 to the microcomputer 3, each device which constitutes said single module 1 is adjusted. The data set at this adjusting time for each adjustment of each device is stored in the built-in memory 2 of the module 1. By connecting this adjusted module 1 to the main unit 251 through the BUS line 6, a video apparatus is constructed, and the data for adjustment stored in the built-in memory 2 of the module 1 becomes usable as they are. Moreover, the built-in memory 2 of the module 1 can also add to its storage the data for the adjustment of each circuit (13, 18) in the main unit 251. Thus, a video apparatus, which does not require redundant checking and adjustment of a single module, is provided.

4 Claims, 3 Drawing Sheets

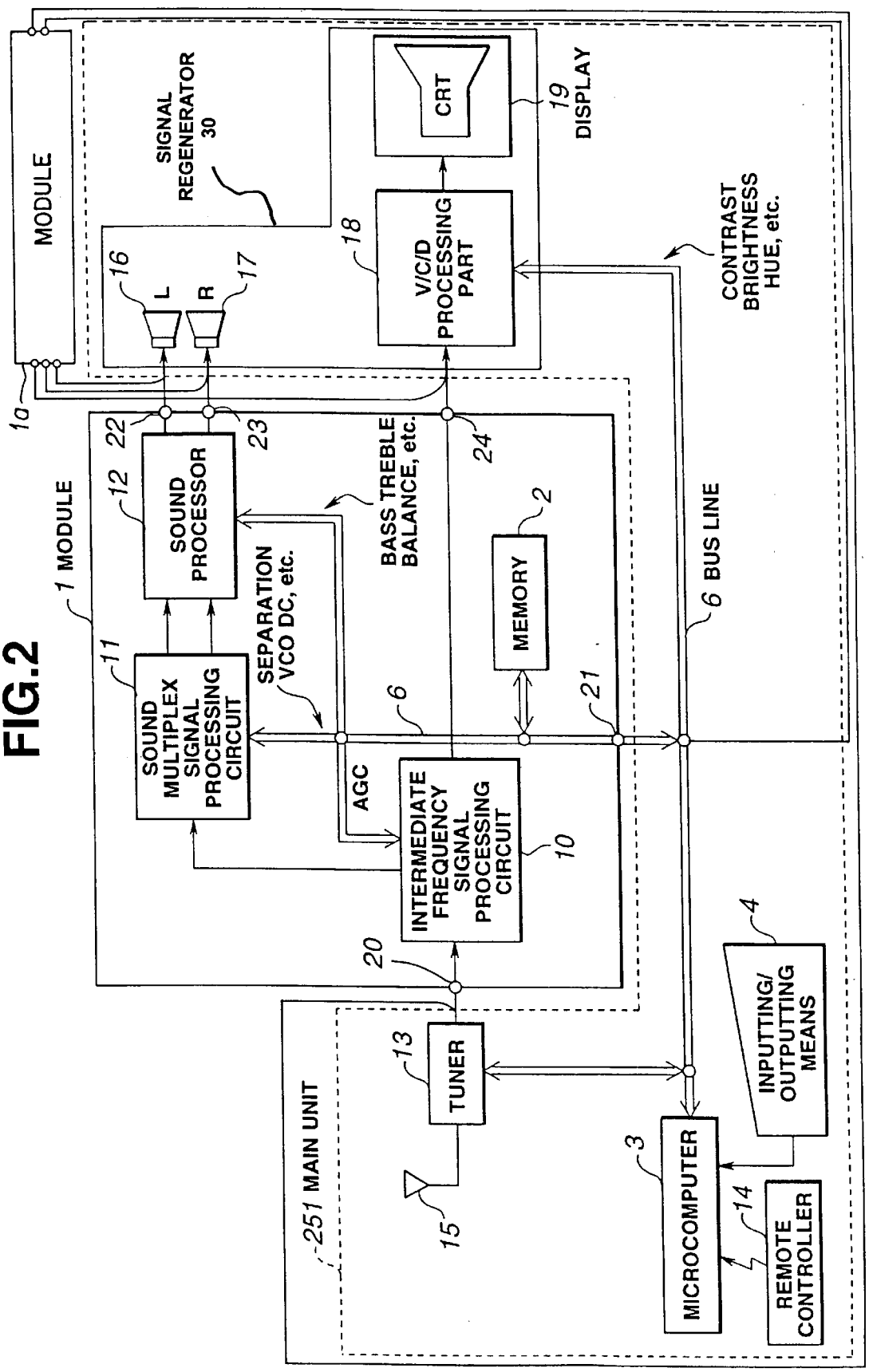

VIDEO APPARATUS WHICH CAN BE ADJUSTED EASILY

BACKGROUND OF THE INVENTION

1. Field of the Invention

The present invention relates to a video apparatus, and more particularly, to a video apparatus simplifying the checking and adjustment of a specific single module which constitutes the video apparatus.

2. Description of the Related Art

In recent years, video apparatuses are manufactured (assembled) by combining a plurality of parts which have been modularized for every function unit. Accordingly, by changing the parts (modules) to be combined variously, many types of products can be designed and manufactured easily and efficiently.

At the same time, it is well-known that broadcasting is done in different broadcasting systems from country to country throughout the world. For example, there are three major television broadcasting systems: NTSC, PAL and SECAM. Each of these systems may still differ in minute details from country to country, particularly in the ex-Communist bloc, even though the same system is used. To cope with such circumstances, there is a need for video apparatus that is able to receive various broadcasts in different television broadcasting systems. At the same time, there is also a need to improve design efficiency and to develop products that have global usefulness by using modular parts to perform functions which differ from one broadcasting system to another. For example, the intermediate-frequency signal processing circuit part and the sound multiplex signal processing circuit part may be used as module parts, while circuit parts which are common regardless of the broadcasting systems remain part of the basic apparatus.

Meanwhile, for the adjustment of various devices comprising the module, a method to adjust by using a microcomputer through the BUS line is used. This technique is called the BUS control and replaces the conventional hand-operated volume adjustment.

FIG. 4 is a block diagram to show an example of an adjustable tester for modules controlled by the BUS control, and FIG. 5 is a flow chart of the checking and adjustment procedures for conventional modules.

In FIG. 4, the adjustable tester 25 carries out a temporary adjustment and the check of the operation on the module 7. The tester 25 has a microcomputer 3, an inputting/outputting means 4, a memory 8 and a BUS line 6.

The microcomputer 3 is provided with various test programs and test data which are necessary for the temporary adjustment of the module 7. The inputting/outputting means 4 inputs control commands and control data to the microcomputer 3, and at the same time, outputs responses to the control commands and control data. The memory 8 stores data for the temporary adjustment of the module 7 and the like. The BUS line 6 is connected to the microcomputer 3, the memory 8 and the module 7.

The module 7 comprises a TV receiver's intermediate frequency signal processing circuit, a sound multiplex signal processing circuit, a sound processor, etc. The BUS line 6 is connectable to each of these circuits. The module 7 is also provided with terminals to input to the intermediate frequency signal processing circuit, to output video signals from the intermediate frequency signal processing circuit, and to output sound signals from L (left) and R (right) of the sound processor.

On the other hand, the main unit of a TV receiver includes a tuner for receiving signals from the antenna and supplying intermediate frequency signals to the module 7, a video signal processing circuit to which the module 7 supplies video signals, a display which is supplied with the output from the video signal processing circuit, and a means to regenerate sound signals from the module. The main unit also has a channel selecting circuit which is connected to the tuner and selects received channels, a memory which is connected to this channel selecting circuit and can store channel data, etc., and a means to receive remote control signals. The channel selecting circuit is controlled by the microcomputer. This microcomputer is connectable to the tuner, video signal processing circuit, and each circuit of the module 7 through the BUS line.

The module 7 is a replaceable part corresponding to the difference in the broadcasting systems. Consequently, replacing this module 7 in accordance with the characteristic of a broadcasting system enables a user to use a main unit of a TV receiver for each of the broadcasting systems and thus, improve design efficiency.

Next, a description will be given on the conventional manufacturing process of video apparatuses based on the checking and adjustment process on a single module 7 shown in FIG. 5.

As shown in FIG. 5, in order to improve the reliability on the modularized parts, first of all, the module 7 is connected to the BUS line 6 of the adjustable tester 25 shown in FIG. 4, and the temporary adjustment of the single module 7 is performed by, for example, inputting some commands or data from the inputting/outputting means (adjusting means) 4 to the microcomputer 3. At this time, the data (offset value, etc.) for each adjustment (temporary adjustment) on each device which comprises the module 7, such as an intermediate-frequency signal processing circuit, a sound multiplex signal processing circuit and a sound processor are stored in the memory 8 of the adjustable tester 25. The temporary adjustment of the module 7 is carried out on each device. For example, the intermediate-frequency signal processing circuit adjustment is done on the AGC level, the sound multiplex signal processing circuit adjustment is done on the inputting level, on the separation of L (left) and R (right) signals, on the DC value of VCO at the PLL circuit, and on other filters, while the sound processor adjustment is carried out on the levels of bass, treble and balance. When the temporary adjustment of this single module 7 is finished, the check of the operation of the single module 7 follows using a prescribed means which is not shown in the figures (Step T1).

The module 7, which has been proved to be normal (good product) through the check of its operation, is mounted on the main unit of a video apparatus (television receiver) (Step T2), and as described above, each device constituting a module 7 is readjusted by, for example, inputting some commands or data to the microcomputer in the main unit from the remote controller. The data for adjustment of each device, including an intermediate-frequency signal processing circuit, a sound multiplex signal processing circuit and a sound processor, is stored in the memory of the main unit (Step T3).

After that, other devices of the main unit, that is, a tuner, a video signal processing circuit and the like are adjusted. The adjustment data on each device is stored in the memory of the main unit (Step T4). As for the adjustment of each device of the main unit, on the tuner, for example, the channel selection is adjusted, and on the video signal processing circuit, contrast, brightness and hue are adjusted.

As described above, according to the procedure of the checking and adjustment process on a single module which operates under the conventional BUS control, none of the modules have a dedicated memory (for example, EEPROM) to store the adjustment data on each device comprising the module 7. This requires the same adjustment twice. The first adjustment is performed before the shipment of modules as parts. The parts are adjusted module by module. The second adjustment is performed when the module is mounted and assembled on the set (the main unit). The module undergoes the same adjustment as the first adjustment, together with other devices of the main unit. The data for adjustment of each device is written in the memory which is built in the set (the main unit). In other words, the process which is carried out in Step T1 in FIG. 5 is repeated in Step T3, thus resulting in additional man-hours for adjustment.

As stated above, for a conventional video apparatus, a single module undergoes various adjustments at the time of manufacture to prepare the apparatus for proper operation before it is shipped. When the module is assembled into a video apparatus, various kinds of adjustments on the module are performed again. This adjustment must check more parts than in the previous adjustment of other circuit parts (for example, the video/chromaldeflection processing circuit), and thus, is time-consuming.

SUMMARY OF THE INVENTION

The present invention has been made in consideration of the aforementioned background.

An object of the present invention is to provide a video apparatus which does not require repetition of checking and adjustment (i.e., readjustment) on the single module, and consequently, requires less man-hours.

Another object of the present invention is to provide a video apparatus which simplifies the work to replace module parts according to specifications.

A video apparatus according to a first embodiment of the present invention is:

a video apparatus has one or more single modules or more with specified functions, and which has a main unit which is mounted with one or more single module on and which operates along with the single module, and
  at least one single module has a built-in memory, a feature of the present invention, to store the data for adjustment obtained during the time of checking and adjustment of the single module.

In the first embodiment of the invention, because at least one single module is designed to store various data for adjustment acquired during the adjustment of the single module in the built-in memory, the readjustment of the single module is made unnecessary when the single module is mounted on a main unit of a video apparatus.

A second embodiment of the invention is characterized in that the memory is built in the module which requires the most processes for adjustment out of all of the one or more single modules.

A video apparatus according to a third embodiment of the present invention is characterized in that the memory in the video apparatus according to the first embodiment stores data for the adjustment of each device of the main unit at the time of the mounting of the single module as well as data for the adjustment of the single module obtained when it underwent the checking and adjustment.

In the third embodiment of the invention, the built-in memory can store various data for the adjustment of the single module and data for the adjustment of each device of the main unit at the mounting time of the single module, thereby enabling the single module and the main unit to share one memory.

A video apparatus according to the fourth embodiment of the present invention comprises:

a television signal processing unit comprising a tuner to receive television broadcasting signals and to generate intermediate frequency signals, a channel selecting means which has a microcomputer for selecting a channel received at said tuner, and a signal regenerating means to process the signals of the channel selected by said channel selecting means and to regenerate video signals and at the same time to regenerate sound signals;
  a module comprising a memory and a signal processing means which is supplied with intermediate frequency signals from said tuner, processes said intermediate frequency signals, and supplies video signals and sound signals to said signal regenerating means of said television signal processing unit; and
  a BUS line which is arranged in said television signal processing unit and said module in order to connect said microcomputer in said television signal processing unit with said signal processing means and said memory in said module.

In a fourth embodiment of the invention, it is possible to reduce the number of adjustment processes after the mounting of a single module on the main unit. This benefit can be achieved by installing memory into a single module that includes comparatively many processing parts, such as the intermediate-frequency signal processing part, the sound multiplex signal processing part and the signal processing part of the sound processor. At the same time, the single module can be used removably for a television signal processing unit, which is a common main unit when the single module is adjusted in advance corresponding to a television broadcasting system (NTSC, PAL, SECAM or the like).

A video apparatus according to the fifth embodiment of the present invention wherein, in said memory of the module, besides the adjustment data obtained at the time of checking and adjustment of said module, the channel data selected at said channel selecting means can be stored.

BRIEF DESCRIPTION OF THE DRAWINGS

FIG. 2 is a block diagram of a video apparatus according to the present invention.

DETAILED DESCRIPTION OF THE PREFERRED EMBODIMENTS

The present invention will now be described in detail with reference to the accompanying FIG. 1 to FIG. 3 which illustrate preferred embodiments of the invention.

Figure 1:
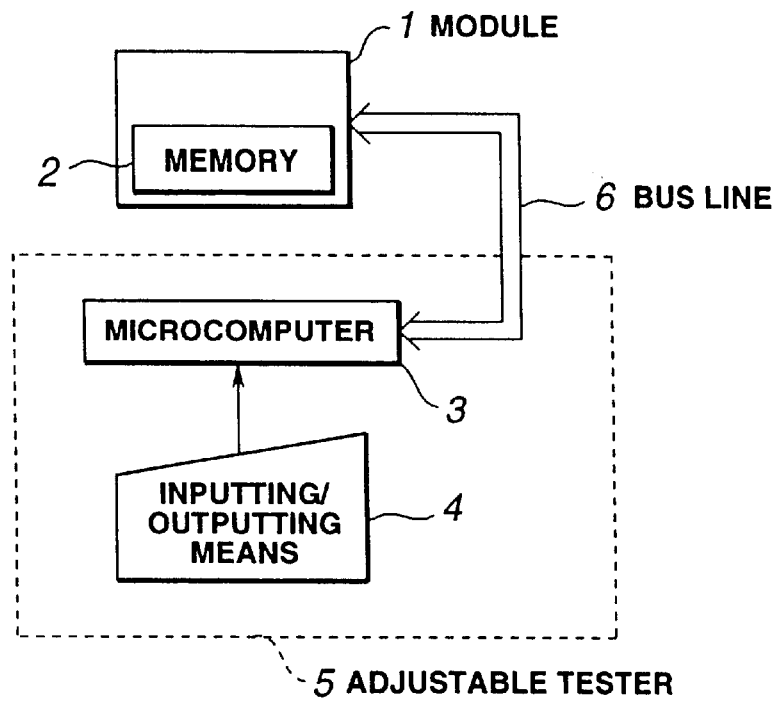
FIG. 1 is a block diagram showing a single module used in the video apparatus according to the present invention, and an example of an adjustable tester to test the single module.

FIG. 1 is a block diagram to show the single module used in the video apparatus, that is, a TV receiver, for example, according to the present invention, and an example of an adjustable tester to test the single module. FIG. 2 is a block diagram of an example of a main unit of a video apparatus on which a module, after being checked, is mounted, and FIG. 3 is a flow chart showing the processes of checking and adjustment of the single module according to the present invention.

In FIG. 1, the module 1, which operates by the BUS control, has a built-in memory 2, and the adjustable tester 5, which carries out the temporary adjustment and the check of the operation, is composed of the microcomputer 3 provided with various test programs and data for tests required for the temporary adjustment of the single module 1, and of the inputting/outputting means 4 which inputs control commands or control data to the microcomputer 3 and at the same time outputs responses to the control commands or control data. The module 1 is connected with the microcomputer 3 through the BUS line 6 which transfers data.

In FIG. 2, on the other hand, the antenna 15 is connected to a tuner 13, the tuner 13 is connected with a terminal 20 of the module 1, the terminals 22 and 23 of the module 1 are connected to the L (left) side loudspeaker 16 and R (right) side loudspeaker 17 respectively, the terminal 24 of the module 1 is connected with the V/C/D (video/chroma/deflection) processing part 18 which constitutes a video signal processing circuit, and the V/C/D processing part 18 is connected with a display 19. The left side loudspeaker 16, the right side loudspeaker 17, the V/C/D processing part 18, and/or the display 19 form signal regenerator 30.

Further, the module 1 is a replaceable module part to be replaced corresponding to each of the broadcasting systems. The terminal 20 is connected with an intermediate-frequency signal processing circuit 10 in the module 1, the intermediate-frequency signal processing circuit 10 is connected with a terminal 24 and a sound multiplex signal processing circuit 11. The sound multiplex signal processing circuit 11 is connected with a sound processor 12. The sound processor 12 is connected with terminals 22 and 23.

Furthermore, each composing part of the main unit 251, such as the microcomputer 3, the tuner 13, the video/chroma/deflection processing part 18, and each composing part of the module 1, such as the memory 2, the intermediate-frequency signal processing circuit 10, the sound multiplex signal processing circuit 11 and the sound processor 12, are all connected to each other by the BUS line 6. The devices which constitute the main unit 251 and the ones which constitute the module 1 are connected by the BUS line 6 through the terminal 21. Also, the microcomputer 3 is connected with the inputting/outputting means 4 and the remote controller 14 through communication media, such as cables and radio transmission lines. It is designed to control, based on instructions (command etc.) from them, the operations of the BUS line 6 and each processing part (circuit etc.) which is connected to the BUS line 6. Moreover, in this embodiment, the inputting/outputting means 4 may be omitted (described later).

Next, a description will be given with reference to FIG. 3 on the procedures for the checking and adjustment of a single module and of the adjustment of the video apparatus according to the present invention.

Figure 3:
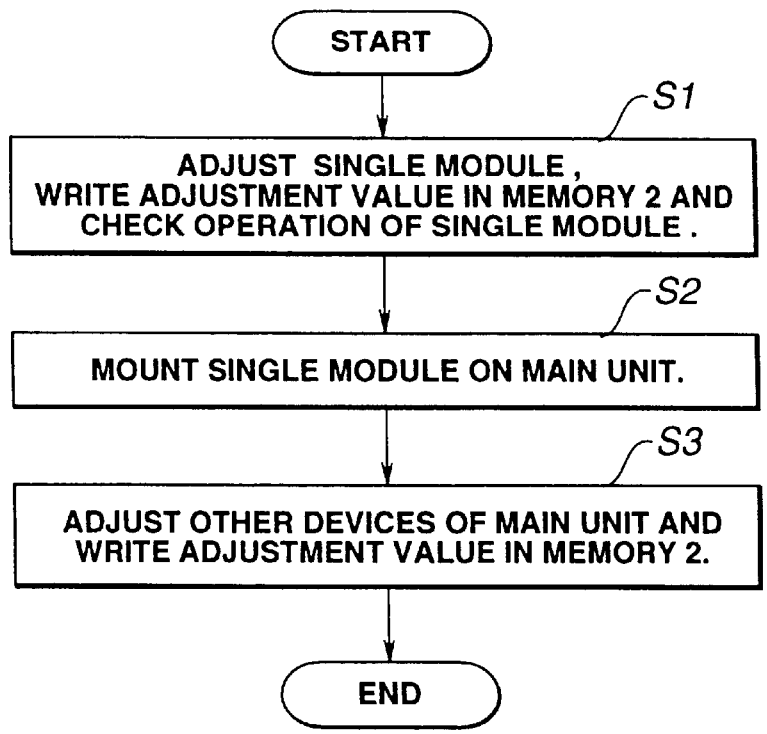
FIG. 3 is a flow chart of the checking and adjustment processes of the single module according to the present invention.
Figure 4:
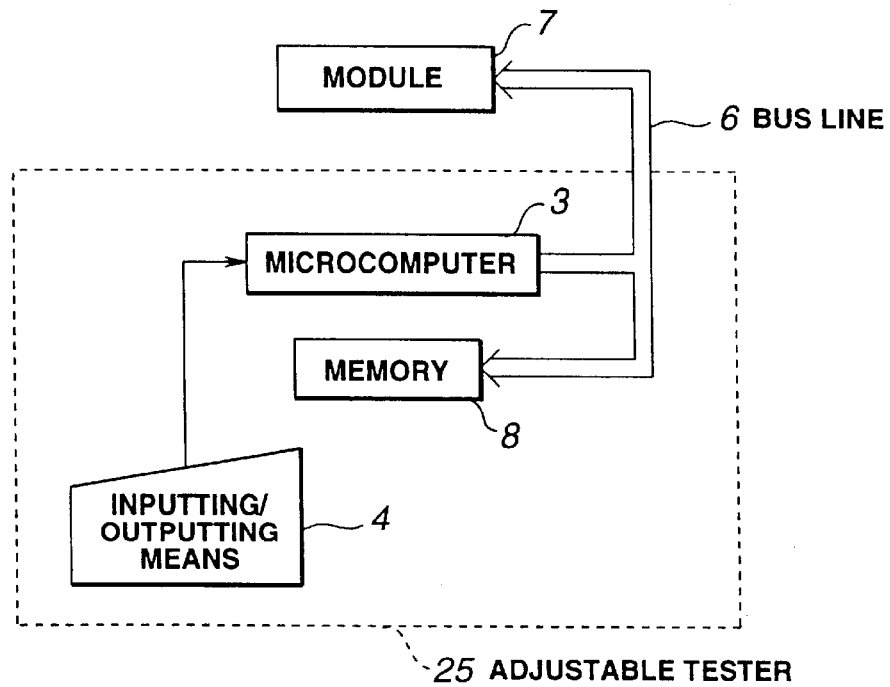
FIG. 4 shows an example of an adjustable tester for a conventional single module.

As shown in FIG. 3, first of all, the check is carried out on the single module in order to improve the reliability on the module parts. That is, the single module 1 is connected to the BUS line 6 of the adjustable tester 5 shown in FIG. 1. Some commands or data are input from the inputting/outputting means (adjusting means) 4 to the microcomputer 3, and the single module 1 is temporarily adjusted. At this time, the data for the adjustment of each device comprising the module 1, that is, devices such as the intermediate-frequency signal processing circuit 10, the sound multiplex signal processing circuit 11, and the sound processor 12 shown in FIG. 2, are stored in the built-in memory 2 of the module 1. The adjustment of the module 1 (according to the embodiment of the present invention, it becomes not the temporary adjustment but the main adjustment) is carried out for each device. Adjustments are made to each device, for example, for the intermediate-frequency signal processing circuit 10, adjustment is done on the AGC level, for the sound multiplex signal processing circuit 11, adjustment is done on the inputting level, the separation of L (left) and R (right) signals, the DC value of VCO at the PLL circuit, and on various filters, and for the sound processor 12, adjustment is done on the bass level, treble level and balance level. When the adjustment of the single module 1 is completed, the check of operations of the single module 1 is carried out by a predetermined means which is not shown (Step S1).

If a single module 1 is proved to be normal (good product) through the check on operations of the single module 1, it is mounted as a module part on the main unit 251 (Step S2).

Figure 5:
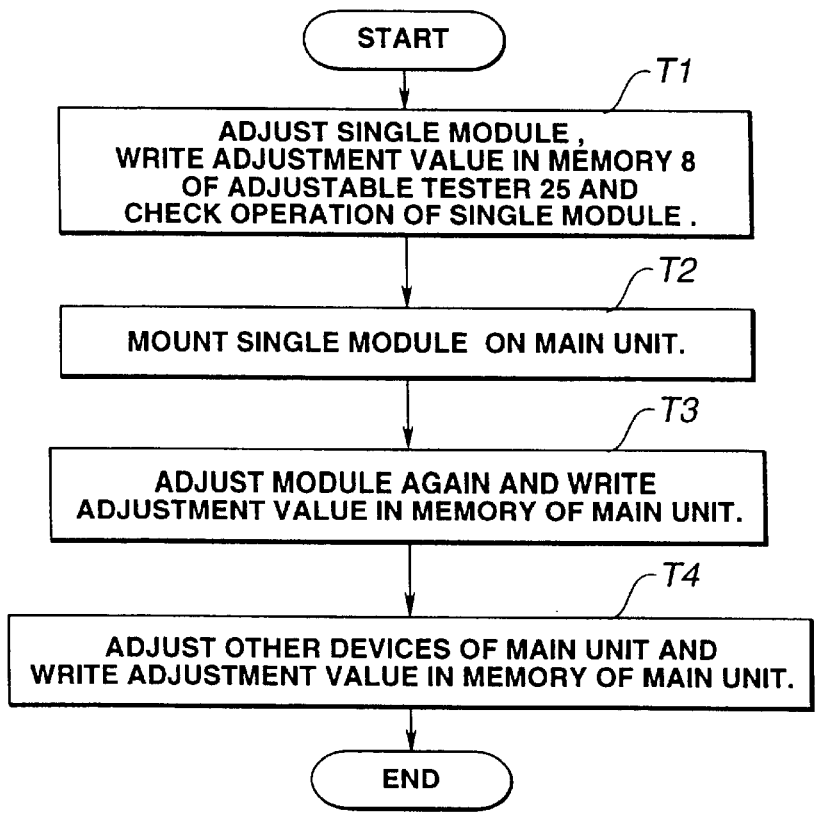
FIG. 5 is a flow chart of the checking and adjustment processes of a conventional single module.

After that, other devices of the main unit 251, such as the tuner 13 and the video/chroma/deflection processing part 18 are adjusted, and the data for the adjustment of each device is stored in the memory 2 which is built in the module 1 (Step S3). The adjustment of each device of the main unit 251 is done similarly to the adjustment of conventional cases. For example, for the tuner 13 the channel selection is adjusted, and for the video/chroma/deflection processing part 18, the contrast, the brightness, the hue etc. are adjusted. Thus, in the embodiment according to the present invention, the processes done in the conventional Step T3 in FIG. 5, that is, readjustment of each device constituting the module 1 and the writing of data in the memory are never carried out.

Therefore, because the readjustment of the module 1 is not done in the embodiment according to the present invention, by carrying out all the adjustment of each device of the main unit 251 using the remote controller 14, the inputting/outputting means 4 in FIG. 2 can be omitted.

Further, the video apparatus according to the present invention can deter an increase in cost by using a memory which also serves for channel selection as the memory 2 which is built in the module 1. Besides, the optimum data for adjustments at the time of various adjustment of the single module 1 can be stored in advance in the built-in memory 2, making the readjustment process on the single module 1 unnecessary.

In this way, once this single module 1 is incorporated in the main unit 251 of a television receiver, the adjustment of the video apparatus according to the present invention can be completed by storing the data for the adjustment of the contrast, brightness, hue etc. for the video/chroma/deflection processing part 18 and the data for channel selection for the tuner 13 in the memory 2 which is built in the module 1.

That is, when the single module 1 is incorporated in the main unit 251, reading out the content stored in the built-in memory 2 in the single module 1 completes the adjustment of the intermediate-frequency signal processing circuit 10, the sound multiplex signal processing circuit 11 and the sound processor 12. Consequently, there is no necessity to repeat the adjustment of these parts, and thus, omitting such redundant readjustment processes becomes feasible.

Furthermore, while the video apparatus has been described in preferred embodiments of the present invention as comprising one module (predetermined function unit) and one main unit, the present invention is not limited only to these embodiments but various changes in combination may be possible (for example, a composition with a plurality of modules with one main unit, etc.). Besides, when a plurality of modules are applied, installing the memory in the module, which requires the most adjustment processes, can simplify the adjustment of the video apparatuses. A video apparatus may comprise a main unit 251 with one module 1 mounted on the main unit 251, or a video apparatus may comprise a main unit 251 with multiple modules 1 and 1*a* mounted on the main unit 251, as shown on FIG. 2.

As stated above, the present invention eliminates the necessity of repeated checking and adjustment of a single module. This feature effectively makes the complicated adjustment of modules unnecessary upon the assembly of video apparatus or replacing service of module parts.

While the present invention has been described above with respect to preferred embodiments thereof, it should be understood that the present invention should not be limited only to these embodiments but various change or modification may be made without any departure from the scope of the present invention. The present invention is of course applicable to other electronic apparatuses than the video apparatus.

What is claimed is:

1. A video apparatus comprising:

a television signal processing unit comprising a tuner to receive television broadcasting signals and to generate intermediate frequency signals, a channel selector including a microcomputer to select a channel received at said tuner, and a signal regenerator to process the signals of the channel selected by said channel selector and to regenerate video signals and at the same time to regenerate sound signals;

a module which can be connected to said television signal processing unit, said module comprising a memory and a signal processor which is supplied with intermediate frequency signals from said tuner, processes said intermediate frequency signals, and supplies video signals and sound signals to said signal regenerator of said television signal processing unit; and a BUS line which is arranged in said television signal processing unit and said module in order to connect said microcomputer in said television signal processing unit with said signal processor and said memory in said module;

wherein, in said memory of said module, adjustment data attained at the time of adjustment of said module and channel selection data to be used at said channel selector can be stored, whereby the signals regenerated by said signal regenerator are controlled using the adjustment data stored in said memory.

2. A video apparatus comprising:

a main unit comprising a microcomputer, a display and main unit circuits;

a plurality of individual modules mounted on said main unit, each of said individual modules being provided with individual circuits which can be connected respectively to said main unit circuits to realize a regenerator operation of video signals on said display, and at least one of said individual modules being provided with adjusted parts; and memory provided in a first one of said individual modules having the most adjusted parts among said individual modules, said memory storing adjustment data when adjusted parts of said first individual module are adjusted and adjustment data of each device of said main unit when said first individual module is mounted, and said stored adjustment data being read under the control of said microcomputer.

3. A video apparatus according to claim 2, wherein, at the time of checking and adjusting said first individual module, said memory stores the adjustment data obtained at the time the adjustment and also stores adjustment data of each device of said main unit when said first individual module is mounted.

4. A video apparatus according to claim 2;

wherein said video apparatus is a television receiver, and said adjustment data of each device of said main unit when said first individual module is mounted comprise data which relate to brightness and contrast of said video signals.

\* \* \* \* \*